(12) United States Patent
Chung et al.

(10) Patent No.: US 8,694,841 B1
(45) Date of Patent: Apr. 8, 2014

(54) METHODS AND DEVICES FOR PREVENTING POTENTIAL MEDIA ERRORS FROM GROWING THERMAL ASPERITIES

(75) Inventors: Heon Ho Chung, Laguna Niguel, CA (US); Chun Sei Tsai, Tustin, CA (US); Carl E. Barlow, Lake Forest, CA (US); Kenneth J. Smith, Corona, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 13/528,686

(22) Filed: Jun. 20, 2012

(51) Int. Cl.
*G11C 29/00* (2006.01)

(52) U.S. Cl.
USPC ............ 714/723; 714/42; 714/710; 714/769; 360/53

(58) Field of Classification Search
None
See application file for complete search history.

(56) References Cited

U.S. PATENT DOCUMENTS

| | | | |
|---|---|---|---|
| 5,442,638 A | 8/1995 | Awad et al. | |
| 5,537,034 A | 7/1996 | Lewis | |
| 5,666,237 A | 9/1997 | Lewis | |
| 5,870,241 A * | 2/1999 | Ottesen et al. | 360/77.02 |
| 5,898,535 A | 4/1999 | Kawai | |
| 5,917,670 A * | 6/1999 | Scaramuzzo et al. | 360/53 |
| 6,034,831 A * | 3/2000 | Dobbek et al. | 360/53 |
| 6,052,804 A * | 4/2000 | Thowe et al. | 714/710 |
| 6,223,303 B1 | 4/2001 | Billings et al. | |
| 6,281,676 B1 | 8/2001 | Ottesen et al. | |
| 6,490,691 B1 * | 12/2002 | Kimura et al. | 714/5.1 |
| 6,504,662 B2 | 1/2003 | Sobey | |
| 6,552,880 B1 | 4/2003 | Dunbar et al. | |
| 6,567,229 B1 | 5/2003 | Mallary et al. | |
| 6,654,904 B1 | 11/2003 | Andoh et al. | |
| 6,985,319 B2 | 1/2006 | Yip et al. | |
| 7,032,127 B1 | 4/2006 | Egan et al. | |
| 7,139,145 B1 | 11/2006 | Archibald et al. | |
| 7,251,908 B2 | 8/2007 | Yori | |
| 7,457,069 B2 | 11/2008 | Yoshioka et al. | |
| 7,583,461 B2 * | 9/2009 | Kudoh et al. | 360/53 |
| 7,656,763 B1 | 2/2010 | Jin et al. | |
| 7,688,540 B1 | 3/2010 | Mei et al. | |
| 7,800,858 B1 | 9/2010 | Bajikar et al. | |
| 7,804,661 B2 | 9/2010 | Wilcox et al. | |
| 7,982,993 B1 | 7/2011 | Tsai et al. | |
| 8,014,245 B2 | 9/2011 | Chen et al. | |
| 8,194,338 B1 | 6/2012 | Zhang | |
| 2001/0048567 A1 * | 12/2001 | Chng et al. | 360/53 |
| 2002/0036858 A1 | 3/2002 | Bi et al. | |
| 2002/0091964 A1 | 7/2002 | Cheok et al. | |
| 2004/0190185 A1 | 9/2004 | Lee | |
| 2007/0153656 A1 | 7/2007 | Mahr et al. | |
| 2009/0052289 A1 | 2/2009 | Chen et al. | |
| 2012/0092975 A1 | 4/2012 | Jun | |
| 2012/0327533 A1 * | 12/2012 | Selvaraj | 360/77.02 |

* cited by examiner

*Primary Examiner* — John Trimmings

(57) ABSTRACT

A method to enable defect margining of a disk drive may comprise executing a data access command on a target sector on the disk drive. Upon encountering a data access error at the target sector, an address of the target sector may be added to an error list. The address of the target sector in the error list may then be converted to a physical location on the disk drive. A thermal asperity scan may be performed at and around the physical location and, upon detecting a thermal asperity, and at least sectors around the detected thermal asperity may be margined, and the data stored within the margined sectors may be relocated. Instead of sectors, entire tracks may be margined and the data stored therein relocated to a spare or reserve location, one track at a time.

32 Claims, 9 Drawing Sheets

METHODS AND DEVICES FOR PREVENTING POTENTIAL MEDIA ERRORS FROM GROWING THERMAL ASPERITIES

BACKGROUND

In disk drives, defects on the media surface can cause the read channel to repeatedly detect incorrect data (hard errors). Very large defects may result in hard errors that are too long for the disk drive ECC algorithm to detect. Defect scans are used in the manufacturing process to flag those sectors with large defects so they are excluded from use during normal drive operation. The defect scan involves two main steps:

1. Write entire media surface with a high frequency repeating patterns;
2. Read back each sector and check for unusual changes in head signal amplitude.

A high frequency pattern is written to maximize the probability of actually writing a transition on a small defect. If a transition is written on a defect, the resulting magnetic head amplitude increases or decreases based on the type of defect. A decrease in magnetic material on the media correspondingly decreases the amplitude of the read back signal (resulting in a localized read back signal drop-out) and an increase in magnetic material on the media correspondingly increases the amplitude of the read back signal (resulting in a localized read back signal drop-in).

Based upon the number of detected defects, it may be determined whether the disk drive is useable or not. The disk drive may fail the manufacturing process when too many defects are detected. Conventionally, if the disk drive is determined to be usable given the number and severity of the detected defects, a predetermined space around the detected defect is designated as a margin that becomes unavailable for user data. However, experience has shown that a detected defect may spread or "grow" from its original position during subsequent use of the disk drive—that is, after the drive has been shipped to the customer. Such defects are commonly known as growing thermal asperity (TA) defects. Conventionally, media defects are detected, margined, and mapped during the manufacturing process. Consequently, when a drive leaves the factory, shipped to the customer and put to use in the field, it is assumed that the probability of finding any new defects is low. Consequently, the capacity to accommodate new defects, such as growing TA defects, in the field is limited.

While TAs are primarily margined out during the manufacturing process, conventional drives do not provide any mechanism for margining out a newly found TA and relocating the data previously stored in the margined out sectors after the drive is shipped and put to use. Due to TA's varying heights and material used to construct the media (AlO$_x$ in particular), a thermal asperity site must be margined extensively (in the order of +/−2 um, or about 80 tracks in a 350K tracks per inch (TPI) hard disk drive design) to avoid collisions with the magnetic head while it is track following in the vicinity. While the margining process is relatively straightforward during manufacturing, it is virtually impossible to carry out margining of a newly-found TA defect after the drive is formatted. Legacy defense methods against grown/missed defects in the field, i.e., relocation, are limited in their capacity and capability and are not is practical to implement for newly-found TAs.

A relocation event is designed to move a defective sector from its previously designated location to a new location. Relocation occurs during a normal write command to a sector previously marked, such as by a TARE (Transparent Automatic Relocation Event) entry, for example. To ensure data integrity, the action involves multiple writes to the new location followed by repeated reads to verify the data. Since this activity takes a long time to complete, relocations are generally done one sector at a time to minimize long write command completion time. As a result, the command time constraints make large scale relocation of many contiguous sectors impractical, if not cost prohibitive, from a timing point of view.

DETAILED DESCRIPTION

Figure 1:
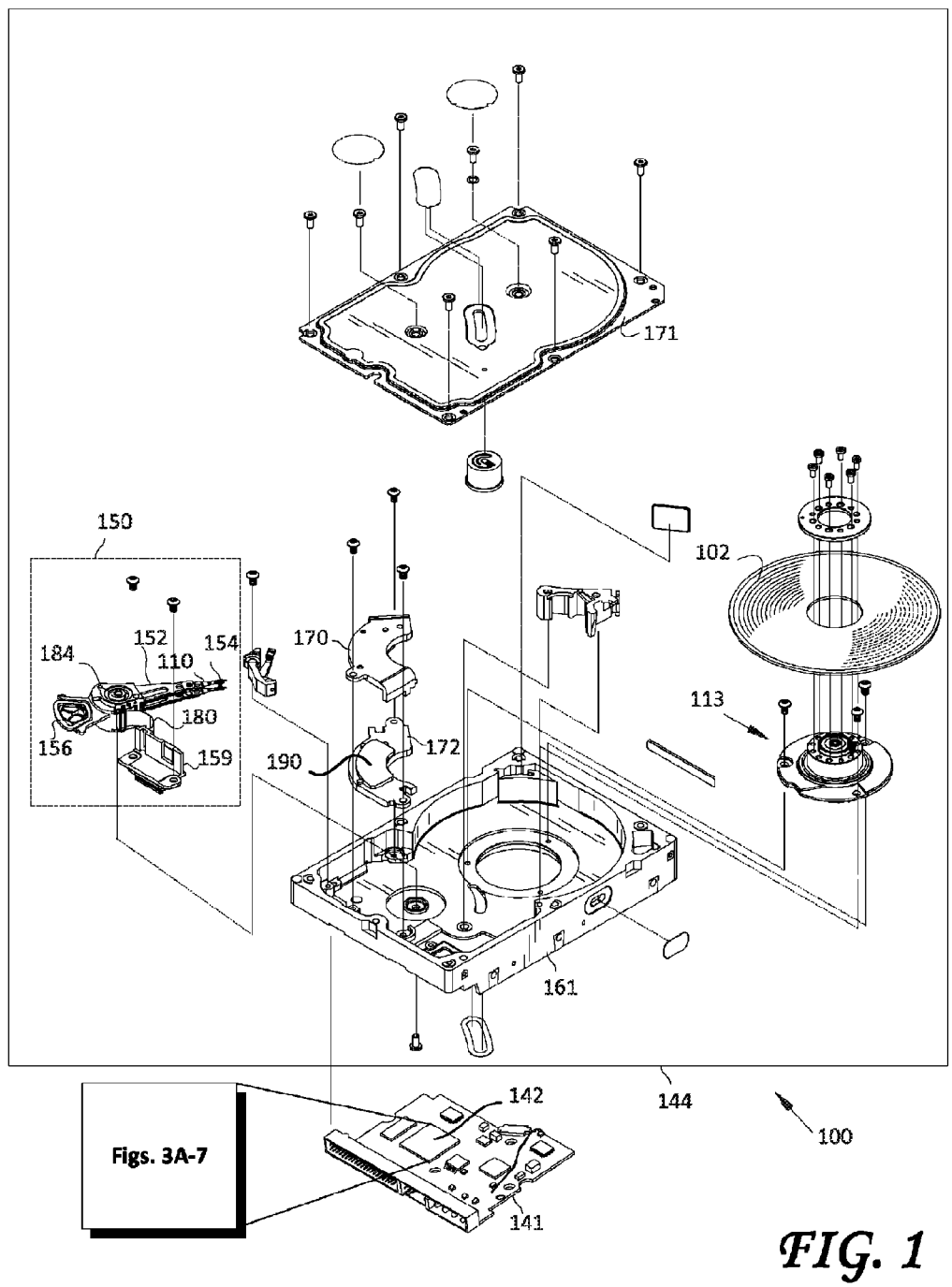
FIG. 1 shows major components of a disk drive, according to one embodiment.

FIG. 1 shows the principal components of an exemplary magnetic disk drive 100 configured for improved margining of detected media defects, according to one embodiment. With reference to FIG. 1, the disk drive 100 comprises a head disk assembly (HDA) 144 and a printed circuit board assembly (PCBA) 141. The HDA 144 may comprise a base 161 and a cover 171 attached to the base 161 that collectively house a disk 102 or a stack of two or more such disks 102. The HDA 144 also includes a spindle motor 113 attached to the base 161 for rotating the disk 102, an HSA 150, and a pivot bearing cartridge 184 that rotatably supports the head stack assembly (HSA) 150 on the base 161. The spindle motor 113 rotates the disk 102 at a constant angular velocity. The HSA 150 comprises a swing-type or rotary actuator assembly 152, at least one head gimbal assembly (HGA) 110 coupled to a load beam that includes a flexure and a flex circuit cable assembly. The rotary actuator assembly 152 includes a body portion, at least one actuator arm cantilevered from the body portion, and a coil portion 156 cantilevered from the body portion in an opposite direction from the actuator arm. The actuator arm supports the HGA 110 that, in turn, includes and supports the slider(s) 154. The flex circuit cable assembly may include the flexible cable 180 and a flex clamp 159. The HSA 150 is pivotally secured to the base 161 via the pivot-bearing cartridge 184 so that the slider 154 at the distal end of the HGA 110 may be moved over the surfaces of the disk(s) 102. The pivot-bearing cartridge 184 enables the HSA 150 to pivot about a pivot axis. The storage capacity of the HDA 144 may be increased by, for example, increasing the tracks per inch (TPI) density on the disk 102 and/or by including additional disks 102 in a disk stack and by an HSA 150 having a vertical stack of HGAs 110 supported by a rotary actuator assembly 152 having multiple actuator arms. The "rotary" or "swing-type" actuator assembly 152 rotates on the pivot bearing 184 cartridge about its pivot axis between limited positions and further includes a coil portion 156 that extends from one side of the body portion to interact with one or more permanent magnets 190 mounted to back irons 170, 172 to form a voice coil motor is (VCM). The VCM causes the HSA 150 to pivot about the actuator pivot axis to cause the slider and the read-write heads thereof to sweep radially over the disk(s) 102. The PCBA 141 includes a controller 142 and control circuitry configured to read data from and write data to the disk(s) 102 and to carry out the methods and margining functionality described and shown herein relative to FIGS. 3A-7.

Figure 2:
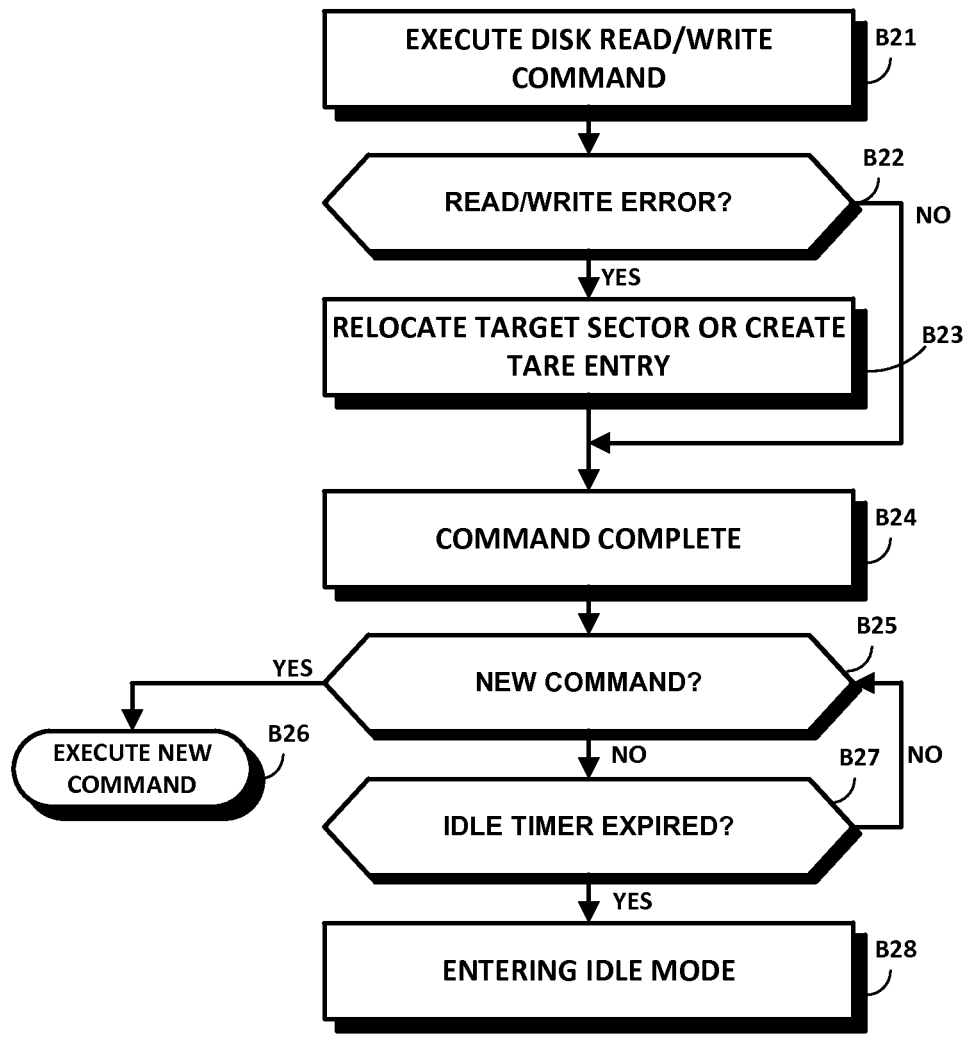
FIG. 2 is a flowchart of a conventional method for relocating an affected sector after a read/write error.

FIG. 2 is a flowchart of a conventional method for relocating an affected sector after a read/write error. As shown therein, Block B21 calls for the disk drive to execute a host command, such as a read or write command. At Block B22, it is determined whether a read or write error has occurred. If an error was encountered (YES branch of Block B22), the drive may relocate the sector at which the error was encountered to a spare (also called reserve) sector and update an exception list (Block B23). The exception list may store the address of the spare sector to which the relocated data was stored, to enable the drive to seek to the stored address to read or write there, instead of the original sector at which the data was previously stored. Alternatively, a TARE may be created at Block B23. A TARE is an unrecoverable error marker, which configures the next write operation to result in automatic relocation of the data stored at the target.

If no error was encountered (NO branch of Block B22) or after relocating the data stored at the sector at which an error was encountered or after creating a TARE (Block B23), the host command is considered to be complete, as shown at Block B24. At Block B25, it is determined whether the host has issued a new host command. The drive then waits for a new host command, until the expiration of an idle timer, as shown at the NO branch of B25 and Bock B27. If a new host command is issued, it is executed as shown at B26. If, however, no command has been issued by the host and received by the drive by the time the idle timer expires, the drive may enter idle mode, as called for by Block B28.

Figure 3A:
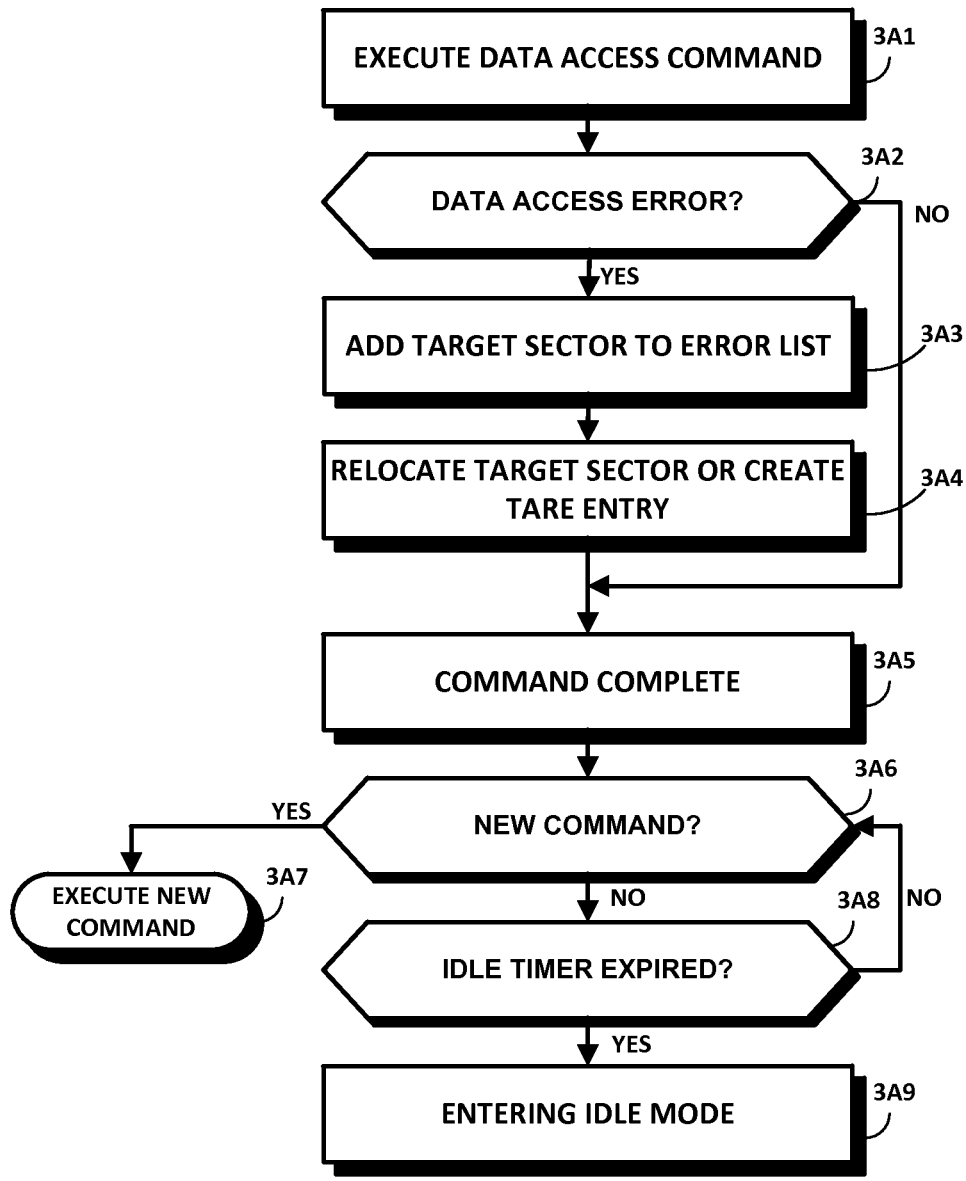
FIG. 3A is a flowchart of a method for adding an entry to an error list noting sector(s) associated with a data access error, according to one embodiment.

FIG. 3A is a flowchart of a method for relocating affected sectors after a read/write error, according to one embodiment. As shown, Block 3A1 calls for the disk drive to execute a data access command (e.g., a read or write command) on a target sector. At 3A2, it is determined whether carrying out the data access command of Block 3A1 resulted in a data access error (e.g., a read or write error) at the target is sector. If a data access error was indeed encountered (YES branch of 3A2), an address of the target sector at which the error was encountered may be added to an error list, as shown at Block 3A3. For example, a logical block address (LBA) of the target sector at which the error was encountered may be added to the error list. The data stored at the target sector at which an error was encountered may then be relocated or a TARE (or functionally similar) entry may be generated, as called for by Block 3A4. In one embodiment, the error list thus accumulates entries reflecting data access errors encountered at run time. In one embodiment, as further shown in FIG. 4A, the error list entries are handled as a background process so as to minimize adverse performance impact to host reads/writes while ensuring that the necessary remedial actions are performed to ensure data integrity in view of the errors encountered.

If no error was encountered at 3A2 or upon completion of the relocation of the data at the target sector or the creation of a TARE entry at 3A4, the host command may be considered to be complete, as shown at 3A5. The status of the relocated data may then be returned, to the host, for example. At Block 3A6, it may be determined whether the host has issued a new host command. The drive may then wait for a new host command, until the expiration of an idle timer, as shown at the NO branch of 3A6 and Bock 3A8. If a new host command is issued, it is executed as shown at 3A7. If, however, no command has been issued by the host and received by the drive by the time the idle timer expires, the drive may enter an idle mode, as called for by Block 3A9.

Figure 3B:
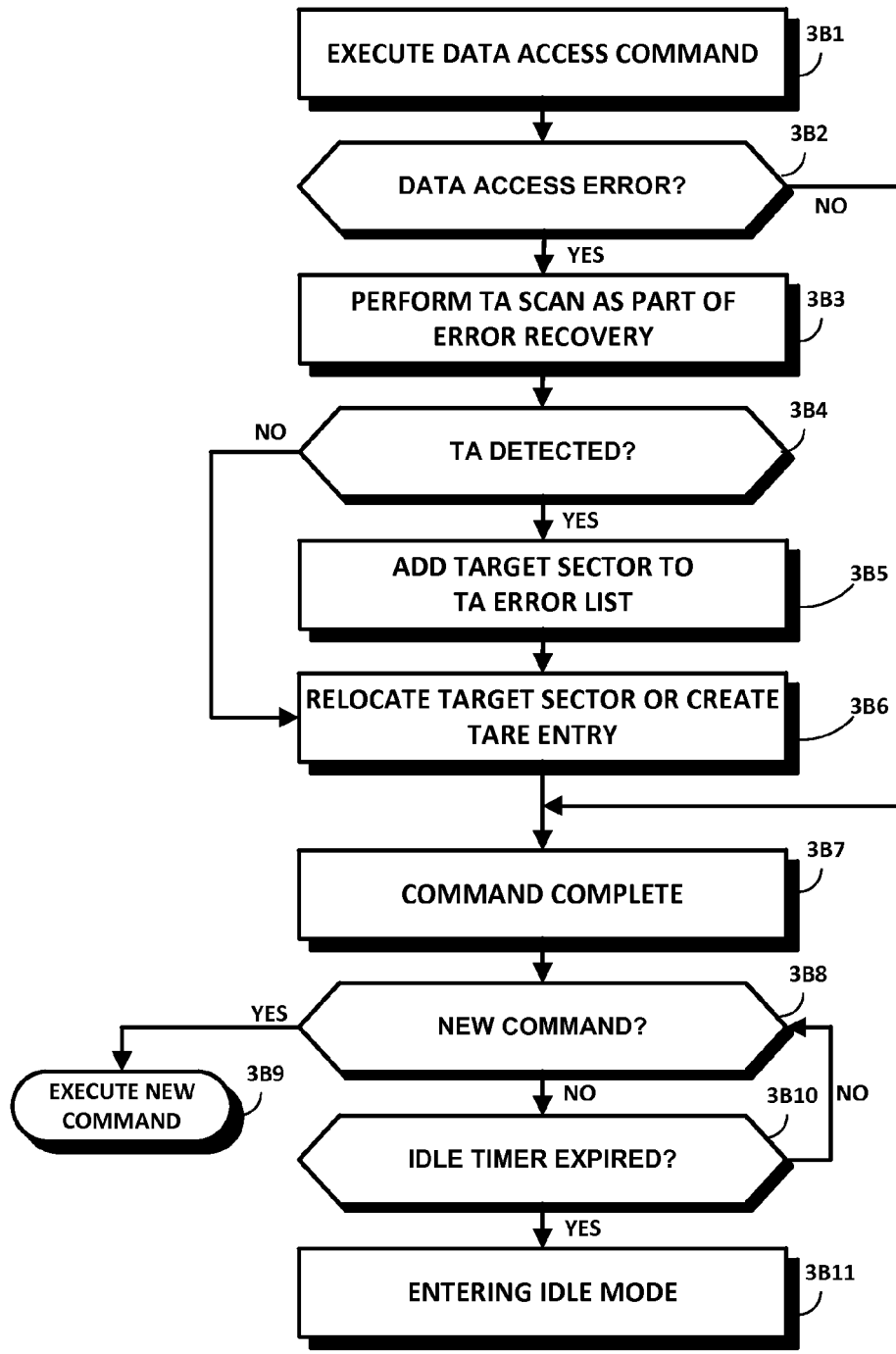
FIG. 3B is a flowchart of a method for adding an entry to an error list noting sector(s) associated with a data access error, according to one embodiment.

FIG. 3B is a flowchart of a method for relocating affected sectors after a read/write error, according to one embodiment. Compared to the method of FIG. 3A, the method FIG. 3B performs an additional action of performing a thermal asperity (TA) scan upon encountering a data access error. As shown, Block 3B1 calls for the disk drive to execute a data access command (e.g., a read or write command) on a target sector. At 3B2, it is determined whether carrying out the data access command of Block 3B1 resulted in a data access error (e.g., a read or write error) at the target sector. If a data access error was indeed encountered (YES branch of 3B2), a TA scan is performed as part of the error recovery process, as shown at 3B3, carrying out a logical address to physical location conversion in the process. Such a thermal asperity scan may be carried out using a touch down sensor, for example, which senses a rapid temperature differential between sectors at which a thermal asperity is not present and sectors at which such a thermal asperity is present. If, as a result of performing the TA scan as part of the error recovery process, a TA is detected as shown at 3B4, an address and/or the physical location of the target sector at which the error was encountered may be added to a TA error list, as shown at Block 3B5. For example, a logical block address (LBA) of the target sector at which the error was encountered may be added to the TA error list. If no TA was detected in 3B4 or after the target sector was added to the TA error list as shown at 3B5, the data stored at the target sector at which an error was encountered may then be relocated or a TARE (or functionally similar) entry may be generated, as called for by Block 3B6. The TA error list thus accumulates detected TAs during runtime. As further described later in conjunction with FIG. 4B, the TA error list is handled by a background process.

If no error was encountered at 3B2 or upon completion of the relocation of the data at the target sector or the creation of a TARE entry at 3B6, the host command may be considered to be complete, as shown at 3B7. The status of the relocated data may then be returned, to the host, for example. At Block 3B8, it may be determined whether the host has issued a new host command. The drive may then wait for a new host command, until the expiration of an idle timer, as shown at the NO branch of 3B8 and Bock 3B10. If a new host command is issued, it is executed as shown at 3B9. If, however, no command has been issued by the host and received by the drive by the time the idle timer expires, the drive may enter an idle mode, as called for by Block 3B11.

Figure 4A:
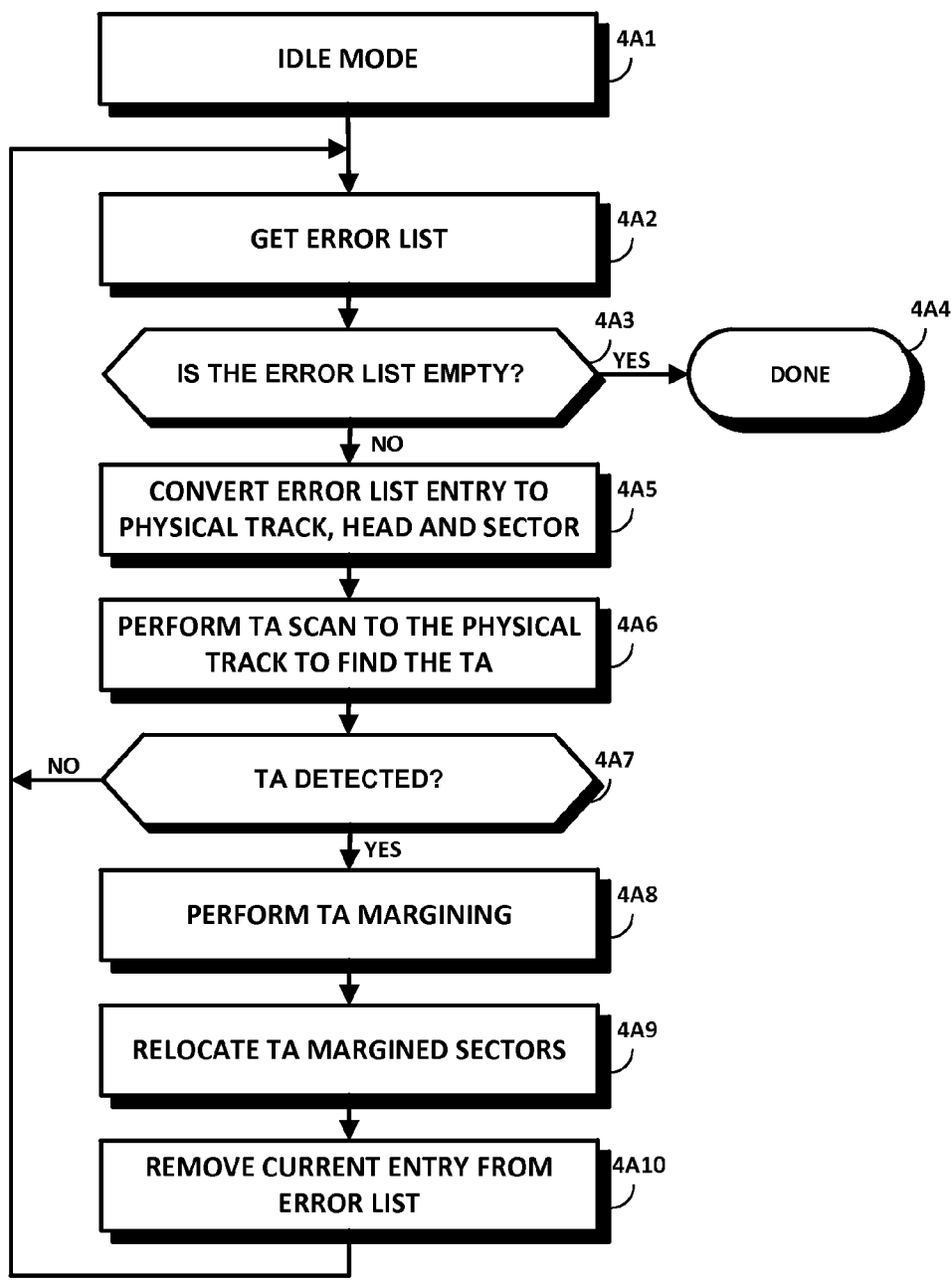
FIG. 4A is a flowchart of a method for processing a target sector on an error list, margining and relocating data due to thermal asperity defects, according to one embodiment.

FIG. 4A is a flowchart of a method for margining and relocating data due to thermal asperity defects, according to one embodiment. It is to be understood that the functionality of the blocks of FIG. 4A is interruptible, to enable the servicing of host commands. In one embodiment, the method of FIG. 4A processes the error list generated in FIG. 3A. Block 4A1, indicating that the drive has entered an idle mode, is also reproduced in FIG. 4A. At Block 4A2, the drive seeks to the location where the error list is stored, opens and reads the error list. If the error list is empty (YES branch of Block 4A3), then the present method may end, as shown at 4A4. The drive may then return, for example, to idle mode, at least until a new host command is received. If the error list is not empty (NO branch of Block 4A3), the controller 142 may be configured to convert, as shown at 4A5, the address of the target sector in the error list to a physical location on the disk drive including, for example, a track, head and sector, to fully qualify the physical location of the error referenced in the error list. At Block 4A6, a thermal asperity scan may be carried out at and around the track, head and sector physical location converted in Block 4A5.

If, at Block 4A7, a thermal asperity is detected, the drive may perform thermal asperity margining, as shown at Block 4A8. If a new TA is encountered during the margining process of Block 4A8, a relocation and margining process may be carried out to relocate any data stored where the TA was encountered and to margin at and around the newly found TA. For example, the data stored where a newly encountered TA may be relocated and the sector and/or track where the newly found TA is located may be designated as being unavailable for use for storing user data. The margining around the newly encountered TA may continue until a predetermined number of defect-free tracks are encountered. If a TA is, in fact, encountered, the relocation and margining process may be continued until the predetermined number of defect-free tracks (e.g., 40) is encountered. The predetermined number of defect-free tracks may depend upon the areal density of the media. During the margining process, if no thermal asperity is detected at Block 4A7, the method may return to Block 4A2, as shown by the NO branch of Block 4A7. After margining at and around the sector at which a thermal asperity was detected, the data stored within the margined sectors may be relocated to a spare location, as shown at Block 4A9 and the status thereof returned, and an entry created within the exception list, to enable the drive to find the relocated data. Now that the sectors at and around the detected thermal asperity have been margined and the data stored therein has been relocated and the exception list updated, the current entry may be removed from the error list, as shown at Block 4A10, whereupon the present method may revert to Block 4A2, to process further entries in the error list, if any. According to one embodiment, the error list may comprise a Check Thermal Asperity (CTA) list. In such a case, Block 4A10 may be effective to remove the LBA of the just-margined and relocated sector from the CTA list.

Figure 4B:
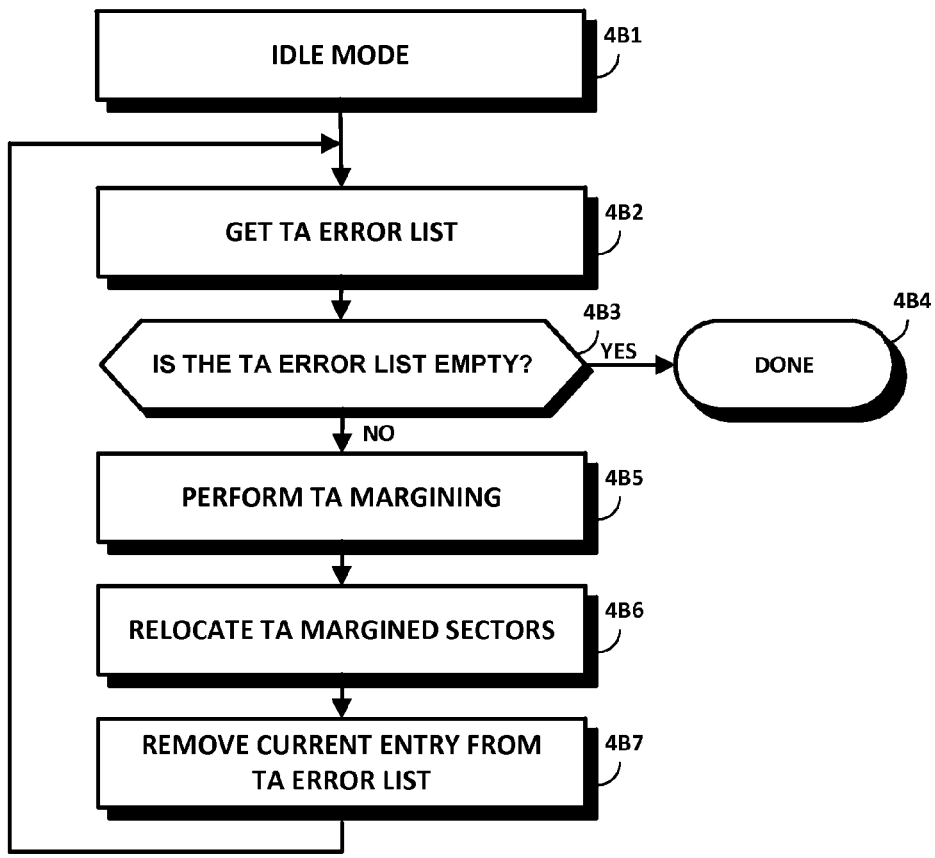
FIG. 4B is a flowchart of a method for processing a target sector on an error list, margining and relocating data due to thermal asperity defects, according to one embodiment.

FIG. 4B is a flowchart of a method for margining and relocating data due to thermal asperity defects, according to one embodiment. It is to be understood that the functionality of each of the blocks of FIG. 4B may be interruptible, to enable the servicing of host commands. In one embodiment, the method of FIG. 4B processes the TA error list generated in FIG. 3B. Block 4B1, indicating that the drive has entered an idle mode, is also reproduced in FIG. 4B. At Block 4B2, the drive seeks to the location where the TA error list is stored, opens and reads the error list. If the TA error list is empty (YES branch of Block 4B3), then the present method may end, as shown at 4B4. If the error list is not empty (NO branch of Block 4B3), the controller 142 may be configured to perform thermal asperity margining, as shown at Block 4B5.

If a new TA is encountered during the margining process of Block 4B5, a relocation and margining process may be carried out to relocate any data stored where the new TA was encountered and to margin at and around the newly found TA. For example, the data stored where a newly encountered TA may be relocated and the sector and/or track where the newly found TA is located may be designated as being unavailable for use for storing user data. The margining around the newly encountered TA may continue until a predetermined number of defect-free tracks are encountered. If a TA is in fact encountered, the relocation and margining process may be continued until the predetermined number of defect-free tracks (e.g., 40) is encountered. The predetermined number of defect-free tracks may depend upon the areal density of the media. After margining at and around the sector at which a thermal asperity was detected, the data stored within the margined sectors may be relocated to a spare location, as shown at Block 4B6 and the status thereof returned, and an entry created within the exception list, to enable the drive to find the relocated data. Now that the sectors at and around the detected thermal asperity have been margined and the data stored therein has been relocated and the exception list updated, the current entry may be removed from the TA error list, as shown at Block 4B7, whereupon the present method may revert to Block 4B2, to process further entries in the TA error list, if any. According to one embodiment, the TA error list may comprise a Check Thermal Asperity (CTA) list. In such a case, Block 4B7 may be effective to remove the LBA of the just-margined and relocated sector from the CTA list.

Figure 5:
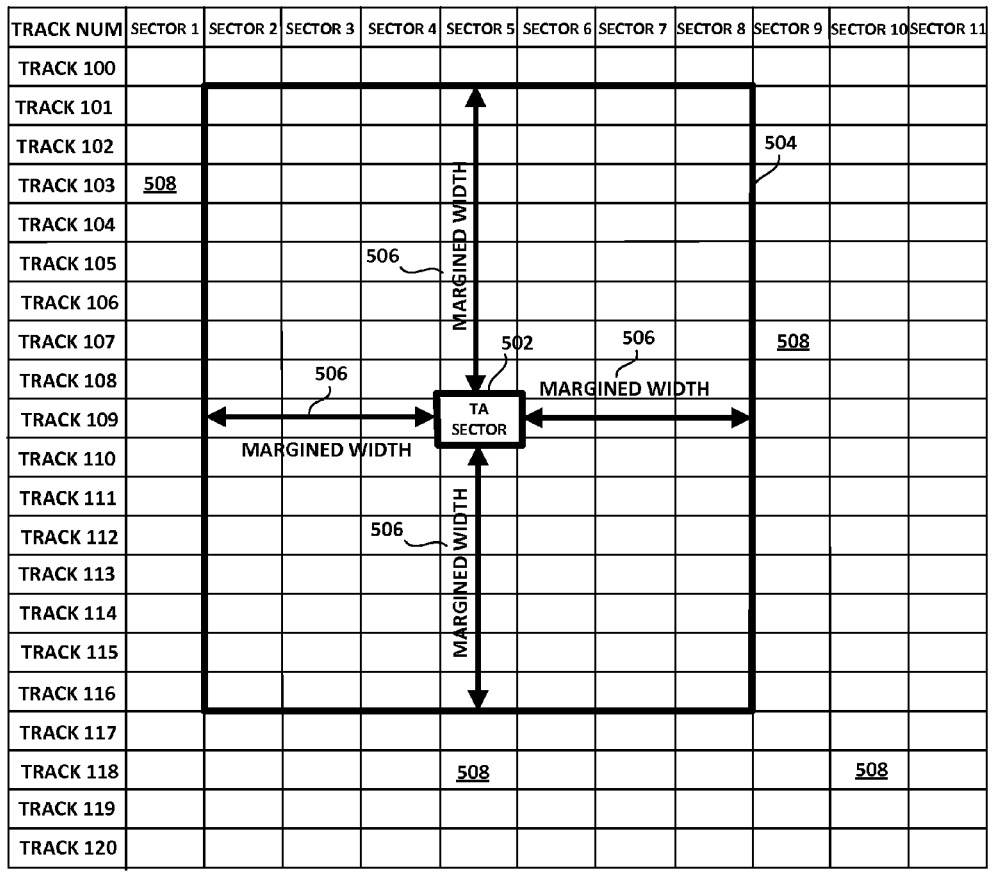
FIG. 5 shows aspects of a method for margining around a detected defective sector, according to one embodiment.

FIG. 5 shows aspects of a method for margining around a detected defective sector, according to one embodiment. According to one embodiment, Block 4A8 of FIG. 4A and/or Block 4B5 of FIG. 4B may margin a plurality of sectors (collectively shown at 504 in FIG. 5) such that the detected thermal asperity 502 is surrounded by a plurality of margined sectors 504. According to one embodiment, Block 4A8 of FIG. 4A and/or Block 4B5 of FIG. 4B may surround the detected thermal asperity 502 by a sufficient number of margined sectors to define a margined width 506 between the detected thermal asperity 502 and non-margined sectors 508 that is at least equal to the width of a gap between the reader and writer of the read/write head(s) of the HSA (150 in FIG. 1) of the disk drive.

In this manner, the margined sectors may prevent the read/write head from reading from or writing to the sector(s) comprising a thermal asperity to avoid contact with the thermal asperity, with an adequate margin of safety around the detected thermal asperity. As shown in FIG. 5, the margined sectors may span a range of sectors and a range of tracks.

Figure 6:
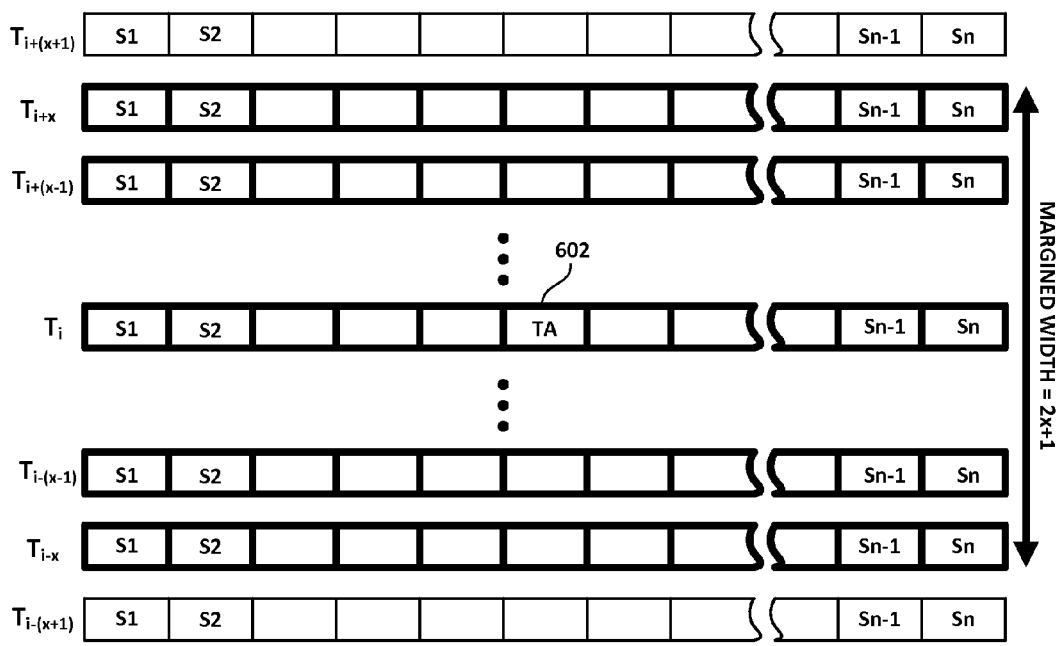
FIG. 6 is a diagram showing tracks that have been margined and relocated, according to one embodiment.

According to one embodiment, Block 4A8 of FIG. 4A and/or Block 4B5 of FIG. 4B may margin not only a subset of the sectors of a plurality of tracks as shown at FIG. 5, but entire tracks. FIG. 6 is a diagram showing tracks that have been margined and relocated, according to one embodiment. FIG. 6 shows a plurality of tracks and assumes that Block 4A7 of FIG. 4A has detected a thermal asperity 602 within some particular $i^{th}$ track $T_i$. Alternatively, the thermal asperity 602 may be referenced by an entry within the TA error list shown in FIG. 4B. Rather than margining and relocating a subset of the constituent sectors of track $T_i$ and a predetermined number of sectors of sectors before and after the detected thermal asperity 602, one embodiment calls for margining a plurality of tracks, such as contiguous or next-adjacent tracks from track $T_i$ to track $T_{i+x}$ tracks and from track $T_i$ to track $T_{i-x}$. In this case, the subscript "x" represents the number of tracks before and after the track of the detected thermal asperity that are to be margined and whose data is to be relocated, according to one embodiment. As shown in FIG. 6, the tracks to be margined and whose data is to be relocated to a spare location on the drive span from $T_{i-x}$ to $T_{i+x}$. For example, in the case wherein x=20, a total of 41 tracks would be margined and the data is stored in those 41 tracks would be relocated to the spare location. Stated differently, if the gap between the reader and writer of the read/write head is on the order of about 2 μm and the media is formatted at about 350 tracks per inch (TPI), x would be equal to about 40 tracks, as about 80 tracks corresponds to a margined width of about +/−2 μm. Therefore, margining about 40 tracks on either side of the thermal asperity would provide adequate clearance for the read/write head with a gap of about 2 μm to avoid collisions with the detected thermal asperity 602 while track following in the vicinity, thereby avoiding or reducing the probability of scratching or scoring the slider.

Figure 7:
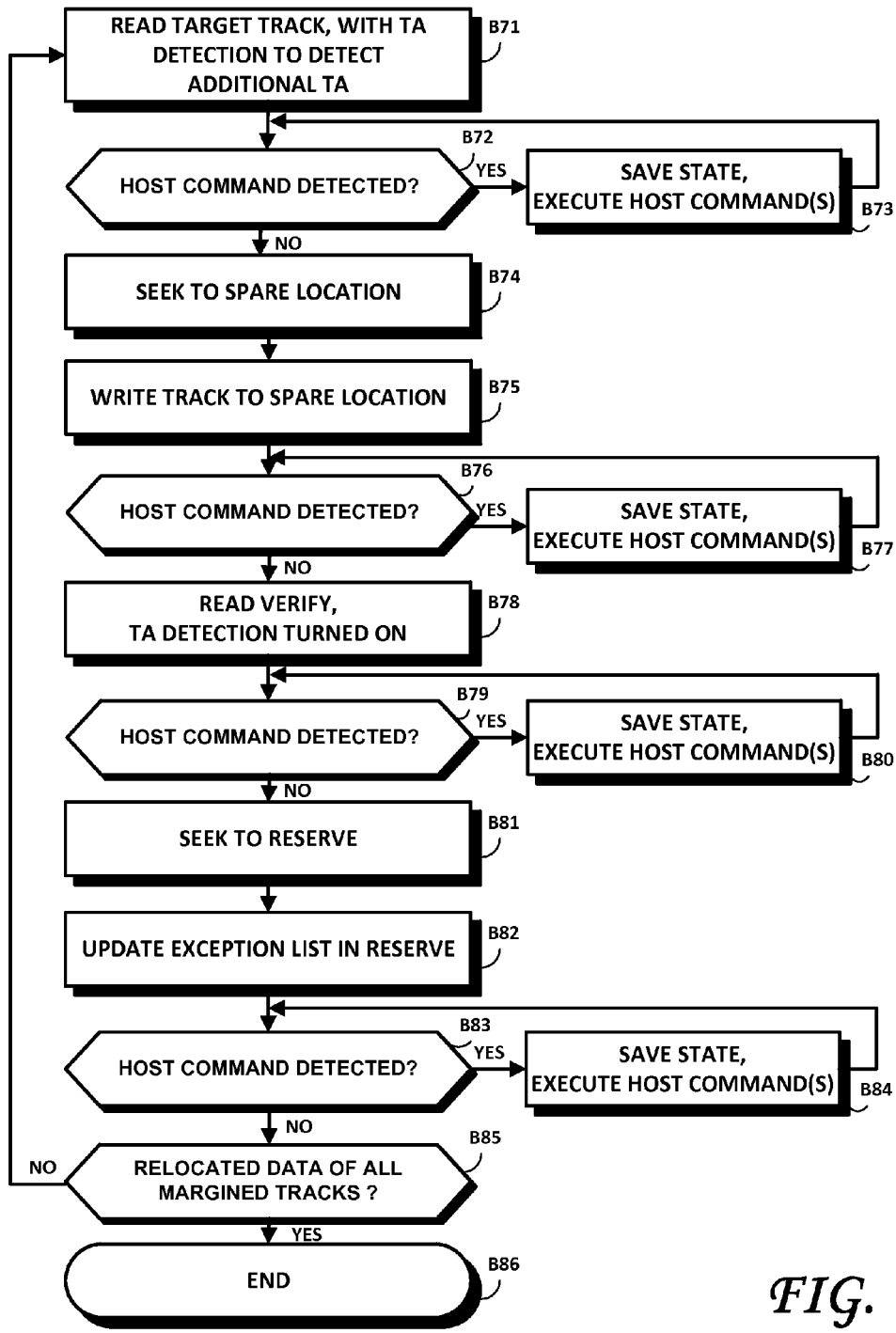
FIG. 7 is a flowchart showing a method for large scale relocation of data subsequent to a detection of a thermal asperity, according to one embodiment.

According to one embodiment, the relocating step shown at Block 4A9 in FIGS. 4A and 4B6 in FIG. 4B may comprise relocating the data of the margined plurality of tracks to a spare location on the disk drive, one track at a time. This is because relocating all margined tracks at the same time may take too long and degrade the performance of the drive by delaying the processing of host commands. FIG. 7 is a flowchart showing such a method for large scale relocation of data subsequent to a detection of a thermal asperity, according to one embodiment. As shown therein, Block B71 calls for reading a target track (such as a margined track or a track to be margined) (e.g., a first/next track of the tracks identified by the margining action shown in FIGS. 4A and 4B), with thermal asperity detection enabled to detect additional thermal asperities. In one embodiment, a target track at which the method should resume from a previously interrupted iteration (e.g., caused by a power loss) can be inferred from the exception list, since the list is updated at Block B82 after a relocated track is written and read verified. The data read from the target track may be temporarily stored in a volatile memory. Once the data stored within the target track has been read, it may be determined whether a host command has been detected, as shown at B72. If a host command has been issued and detected (YES branch of B72), state information may be saved to enable seamless resumption of the method upon completion of the to-be-executed host command, and the host command may be executed, as shown at B73, whereupon the method may revert back to B72 and may resume using the saved state information. Additionally, the saving of the state information here and at the other such blocks shown in FIG. 7 may enable seamless recovery in the case of, for example, a power disruption. If no (further) host command or commands have been detected (NO is branch of B72), Block B74 calls for the drive to seek to the spare or reserve location and to write the read data to the spare location, as shown at B75. This writing may take two revolutions of the disk, for example.

After the writing, it may be determined whether a host command has been detected, as shown at B76. If a host command has been issued and detected (YES branch of B76), state information may be saved and the host command may be executed, as shown at B77, whereupon the method may revert back to B76 and may resume using the saved state information. If no (further) host command or commands have been detected (NO branch of B76), the just-written data may be verified (e.g., read back and compared to the previously read data), as shown at block B78. Again, it may be determined whether a host command has been detected, as shown at B79. If a host command has been issued and detected (YES branch of B79), state information may be saved and the host command may be executed, as shown at B80, whereupon the method may revert back to B79 and may resume using the saved state information. If no (further) host command or commands have been detected (NO branch of B79), the method may proceed to block B81. Indeed, now that the data has been read from the target track, written to the spare location and verified, the drive may seek to the reserve as shown at Block B81 and update the exception list to reflect the relocation, as shown at Block B82. Updating the exception list may take, for example, two revolutions. To avoid taking the disk drive off-line for too long of a time period, between each relocation of a track, it may be determined whether the host has issued a command, as shown at B83. If the host has indeed issued a command (YES branch of B83), state information may be saved and that command may be executed, as shown at B84. After execution of the command the method may use the saved state information to resume at B83. If no host command has been issued (NO branch of B83, it may be next, at Block B85, determined whether the data for all margined or to be margined tracks has been relocated. If the data of all tracks that were margined or are to be margined have been relocated (YES branch of B85), the method may end at B86. If not all tracks that were margined or that are to be margined have been relocated (NO branch of B85), the method may revert to B71, to process another track. If the data of all tracks to be margined has been relocated, the method may end, as shown at B86. For example, the drive may return to idle mode or process host commands, as appropriate.

According to one embodiment, one or more of the steps detailed above relative to FIGS. 4A-7 may be carried out as a background process. Moreover, the track(s) (Ti in FIG. 6) containing the thermal asperity 602 may be relocated together with the surrounding tracks or separately therefrom.

One embodiment may be carried out subsequent to making a TARE due to an error that that is determined to be caused by a thermal asperity. For example, an LBA may be marked as a TARE when an unsuccessful read, either through a host command or by a defect scan, is executed. The physical location corresponding to the TARE entry may be defined as a thermal asperity-induced TARE when the thermal asperity sensor (such as the thermal sensor) detects the presence of a thermal asperity during a read error recovery procedure or during a thermal asperity scan, such as at Block B71 in FIG. 7. The TARE entry may either be unchanged and its data un-relocated or the data stored at the TARE sector may be relocated upon processing the next write. According to one embodiment, when a plurality of tracks are relocated one track at a time, one or more of the steps of the process may be carried out as background process that may be interrupted or cancelled at any time to, for example, process host commands. When the host command or commands are completed, the next track may be relocated, until all tracks to be relocated have been relocated, as suggested at Block B85 in FIG. 7. The relocation of each track, according to one embodiment, may not be considered complete until the exception list in the reserve is updated, as shown at B82 in FIG. 7. Should there be an interruption during the relocation of a track caused by, for example, a reset or power loss during a relocation and prior to the update of the exception list in the reserve, the relocation of that track may be carried out again. According to one embodiment, upon each relocation of a track to the reserve, a read and verify cycle may be carried out, to ensure the integrity of the relocated data. According to one embodiment, a timer may be configured to limit the amount of time spent on such large scale relocation. For example, the timer may be configured to cause the relocation to process to interrupt if it takes longer than about 200 ms. The process may resume at some later time, after checking for and carrying out unfulfilled host commands and/or other housekeeping is duties, for example.

According to one embodiment, the exception list may be configured to accept not only sector-based entries, but also track-based entries. The exception list may be configured to hold a predetermined number of entries. For example, the exception list may be configured to hold 3,000 entries. If limited to sector entries, these 3,000 entries may be configured to reference only about two tracks. If, however, those same 3,000 entries are configured (by suitably modifying the drive's firmware, for example) to reference 3,000 tracks, the data that may be relocated to the reserve is considerable larger. For example, each entry in the exception list may be configured to store a beginning LBA and an ending LBA. For example, the beginning LBA may be the first sector of a given track and the ending LBA may be the last sector of that given track. Alternatively still, the beginning and ending LBAs may span more than one track, further increasing the amount of data that may be referenced by the exception list and relocated to the reserve. For example, if a drive is configured with, say, 1,000 tracks of reserve space, about 70% of those tracks or 700 tracks may be used for factory margining of defects found before the drive is shipped. After the drive is shipped to the customer, about 30% or 300 tracks of the reserve remain available for dynamic, track-based relocation of data caused by thermal asperities, according to the various embodiments described herein.

While certain embodiments of the inventions have been described, these embodiments have been presented by way of example only, and are not intended to limit the scope of the inventions. Indeed, the novel methods, devices and systems described herein may be embodied in a variety of other forms. Furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions. For example, those skilled in the art will appreciate that more than one track may be relocated at a time or that the margined width may be varied at will. Depending on the embodiment, certain of the steps described herein may be removed, others may be added. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

The invention claimed is:

1. A method to enable defect margining of a disk drive storing user data, the method comprising:
   executing a data access command on as target sector on the disk drive to access at least user data;
   upon encountering a data access error at the target sector, adding an address of the target sector to an error list;
   converting the address of the target sector in the error list to a physical location on the disk drive;
   performing a thermal asperity scan at and around the physical location; and
   upon detecting a thermal asperity, margining at least sectors around the detected thermal asperity and relocating at least the user data previously stored within the margined sectors.

2. The method of claim 1, wherein converting, performing and margining are performed as a background process.

3. The method of claim 1, wherein margining is performed as a background process.

4. The method of claim 1, wherein adding the address of the target sector comprise adding logical block address of the target sector to the error list.

5. The method of claim 1, further comprising removing the address of the target sector from the error list after relocating the data stored in the margined sectors.

6. The method of claim 1, wherein margining at least surrounding the detected thermal asperity comprises margining a plurality of sectors such that the detected thermal asperity is surrounded by a plurality of margined sectors.

7. The method of claim 1, wherein margining at least surrounding the detected thermal asperity comprises surrounding the thermal asperity by sufficient number of margined sectors to define a margined width between the detected thermal asperity and non-margined sectors that is at least equal to a width of a gap between at reader and writer of a read/write head of the disk drive.

8. The method of claim 1, wherein margining at least sectors around the detected thermal asperity comprises margining a plurality of tracks, and wherein relocating at least data stored within the margined sectors comprises relocating data of the plurality of tracks to a spare location on the disk drive.

9. The method of claim 8, wherein relocating comprises relocating data of the plurality of tracks to a spare location on the disk drive, one track at a time.

10. The method of claim 9, further comprising updating an exception list after each track is relocated.

11. The method of claim 9, wherein, after relocating each track, the method further comprises determining whether a host command has been issued and executing any host command having been issued.

12. The method of claim 9, further comprising verifying each relocated track before relocating a next track.

13. The method of claim 9, further comprising returning a status of the relocating of data in the plurality of tracks.

14. A disk drive storing user data, comprising:
   a read/write head;
   a disk, the disk being formatted to comprise a plurality of tracks, each track defining a plurality of sectors; and
   a controller configured to:
      execute a data access command on a target sector on the disk drive to access at least the user data;
      upon encountering a data access error at the target sector, add an address of the target sector to an error list;
      convert the address of the target sector in the error list to a physical location on the disk drive; and
      perform a thermal asperity scan at and around the physical location; and
      upon detecting a thermal asperity, margin at least sectors around the detected thermal asperity and relocating at least the user data stored within the margined sectors.

15. The disk drive of claim 14, wherein the controller is further configured to carry out the converting, performing and margining as a background process.

16. The disk drive of claim 14, wherein the controller is further configured to carry out margining as a background process.

17. The disk drive of claim 14, wherein the controller is further configured to add a logical block address of the target sector to the error list.

18. The disk drive of claim 14, wherein the controller is further configured to remove the address of the target sector from the error list after the data stored in the margined sectors has been relocated.

19. The disk drive of claim 14, wherein the controller is further configured to margin at least sectors around the detected thermal asperity such that the detected thermal asperity is surrounded by a plurality of margined sectors.

20. The disk drive of claim 14, wherein the controller is further configured to surround the thermal asperity by a sufficient number of margined sectors to define a margined width between the detected thermal asperity and non-margined sectors that is at least equal to a width of a gap between a reader and writer of the read/write head.

21. The disk drive of claim 14, wherein the controller is further configured to:
margin a plurality of tracks; and
relocate data stored in the plurality of tracks to a spite location on the disk drive.

22. The disk drive of claim 21, wherein the controller is further configured to relocate data of the plurality of tracks to a spare location on the disk drive, one track at a time.

23. The disk drive of claim 22, wherein the controller is further configured to update an exception list after the data of each track is relocated.

24. The disk drive of claim 22, wherein the controller is further configured to after relocating the data of each track:
determine whether a host command has been issued; and
execute any host command having been issued.

25. The disk drive of claim 22, wherein the controller is further configured to verify each relocated track before relocating a next track.

26. The disk drive of claim 22, wherein the controller is further configured to return a status of the relocation of data in the plurality of tracks.

27. A method of operating a disk drive, comprising:
writing user data to a target sector on the disk drive;
reading the target sector and encountering a read error at the target sector;
adding an address of the target sector to an error list;
converting the address of the target sector in the error list to a physical location on the disk drive;
performing a thermal asperity scan at and around the physical location; and
upon detecting a thermal asperity, margining at least sectors around the detected thermal asperity and relocating any user data stored within the margined sectors.

28. The method of claim 27, wherein at least margining is performed as a background process.

29. The method of claim 27, further comprising removing the address of the target sector from the error list after relocating the user data previously stored in the margined sectors.

30. The method of claim 27, wherein margining at east surrounding the detected thermal asperity comprises margining as plurality of sectors such that the detected thermal asperity is surrounded by a plurality of margined sectors.

31. The method of claim 27, wherein margining at least surrounding the detected thermal asperity comprises surrounding the thermal asperity by a sufficient number of margined sectors to define a margined width between the detected thermal asperity and non-margined sectors that is at least equal to a width of a gap between a reader and writer of a read/write head of the disk drive.

32. The method of claim 27, wherein margining at least sectors around the detected thermal asperity comprises margining a plurality of tracks, and wherein relocating at least data stored within the margined sectors comprises relocating data of the plurality of tracks to a spare location on the disk drive.

* * * * *